United States Patent [19]
Livingston et al.

[11] Patent Number: 4,572,634
[45] Date of Patent: Feb. 25, 1986

[54] METHOD OF AND SYSTEM FOR IDENTIFYING SUBJECTS

[75] Inventors: James J. Livingston, Waltham; Duncan C. Sorli, Chelmsford, both of Mass.

[73] Assignee: Polaroid Corporation, Cambridge, Mass.

[21] Appl. No.: 679,254

[22] Filed: Dec. 7, 1984

[51] Int. Cl.⁴ .................. G03B 17/50; G03D 9/00
[52] U.S. Cl. .................. 354/84; 354/105; 354/301
[58] Field of Search .................. 354/84–87, 354/105–109, 301–305; 355/27, 28

[56] References Cited

U.S. PATENT DOCUMENTS

| | | | |
|---|---|---|---|
| 3,491,675 | 1/1970 | Gold | 95/89 |
| 3,709,597 | 1/1973 | LaRocca | 355/61 |
| 3,722,393 | 3/1973 | Drevitch | 95/86 |
| 3,775,594 | 11/1973 | Pasieka et al. | 235/61.11 |
| 3,795,351 | 3/1974 | Lehmann | 222/209 |
| 3,827,726 | 8/1974 | McVoy et al. | 283/7 |
| 3,870,582 | 3/1975 | Brackett et al. | 156/306 |
| 3,928,863 | 12/1975 | Stewart et al. | 354/109 |
| 4,248,510 | 2/1981 | Baker et al. | 354/109 |
| 4,427,279 | 1/1984 | Edelstein et al. | 354/107 |

Primary Examiner—William B. Perkey
Attorney, Agent, or Firm—Leslie J. Payne

[57] ABSTRACT

There is disclosed an improved and economical identification system wherein photographic apparatus at a plurality of field locations provide positive prints of individuals being identified and wherein the prints and appropriate alphanumeric information are forwarded to a central processing apparatus whereat the prints and information are photographed onto diffusion transfer film and then processed so as to facilitate formation of identification cards.

5 Claims, 4 Drawing Figures

METHOD OF AND SYSTEM FOR IDENTIFYING SUBJECTS

BACKGROUND OF THE INVENTION

The present invention relates to a method of and system for producing identification cards and, more particularly, it is related to an improved high speed and relatively uncomplicated method of and system for producing identification cards of the photographic type.

Photographic identification cards are widely accepted and used throughout the world for a variety of public and private purposes. These cards are in demand because, among other features, they enable easy and reliable identification and verification of the bearers of such cards.

Some early identification systems included the steps of cutting a photograph and pasting it onto an indicia bearing card. Thereafter, the composite photograph and indicia bearing card were laminated to form an identification card. As can be appreciated, this process did not lend itself to high volume production. Moreover, it was subject to problems such as the wrong photograph and card being attached together through either confusion or deception.

Improvements over the foregoing technique involved simultaneously taking a single image of the subject to be photographed together with the related indicia card. Thereafter, the composite image was laminated to form the identification card. Examples of these kinds of identification systems are the Polaroid ID-2 or ID-3 Land Identification Systems. In these systems, a data card containing the desired descriptive information is integrated with the camera so that the subject and the descriptive matter pertaining to the subject are simultaneously exposed on a film strip to provide a single developable image. Thereafter, the strip is processed to provide a transfer print having thereon an image-bearing layer containing an image of the subject at one portion thereof and the descriptive matter at another. These systems serve quite satisfactorily. However, they require a somewhat complicated and expensive apparatus at each field location. Moreover, such systems, to be effective in the field, require additional steps such as laminating, die cutting and sealing for enhancing the appearance and stability of the finished identification card.

With any identification system it is important to be able to provide duplicates. For making duplicate cards, cameras have been developed which are relatively complicated insofar as they require dual subject and data card imaging systems. Commonly assigned U.S. Pat. No. 3,928,863 is an example of an identification camera having an image duplicating system. U.S. Pat. No. 4,248,510 is an example of identification camera system wherein a card is to be produced and a lens system records a duplicate image on a photographic film. Both of these latter duplicating systems perform satisfactorily, but are relatively complicated and expensive, especially if many are to be used at plural locations.

Also with identification cards of the foregoing type it is critical that they be validated so as to discourage tampering or alteration thereof. Validating steps tend to be expensive and this, of course, adds to the expense of the final identification card containing them. One relatively simple and, therefore, less expensive technique is disclosed in U.S. Pat. No. 3,775,594, wherein validating information is encoded photographically onto the composite photograph of the subject and identifying indicia. There is a drawback with the foregoing approach insofar as each camera taking the subjects' image must contain a verification system. It will be understood that with many cameras with validating systems at different field locations there is greater likelihood that the validating system will be compromised. This is significant given that many companies and government agencies have a need for identification systems at branch facilities of field locations scattered over large geographical areas.

The foregoing systems described are of the type which use instant developing film. There are, however, other photographic identification systems which rely on conventional negative film to record composite images of the person and the related identifying indicia. These latter systems are referred to as wet processing systems and suffer several significant drawbacks. Primarily, these are due to the inherently complicated and cumbersome nature of a wet process wherein precise chemical processing and control are needed to properly develop the exposed images. Aside from the foregoing drawbacks they tend to be less reliable insofar as one cannot determine whether the subject being identified was properly photographed until an entire roll of film has been photographed and processed. Such a delay can take several weeks. It is clear, therefore, that such a system suffers from several drawbacks.

SUMMARY OF THE INVENTION

It is an object of the present invention to overcome the disadvantages of known identification methods and systems by providing an inexpensive, high volume and highly reliable identification method and system.

In accordance with the present invention there is provided an economical method of preparing identification documents, each containing a composite photograph of a subject and related indicia identifying the subject. Included are the steps of exposing an image of a subject to be identified onto a film plane of self-developing type film which provides instantly a positive print. Accordingly, the quality of the photographed image can be determined before forwarding to a central identification processing station. The photograph is transmitted along with appropriate information identifying the subject on the positive photographic print to a central identification processing station.

At this central station each of the photographic prints is separately exposed in a camera on successive sections of an elongated strip of negative diffusion transfer film simultaneously with indicia identifying the subject of the corresponding positive prints. Following exposing, the strip is transferred to a processing device. The strip of negative is advanced automatically along a first path to an applicating station. At the same time a second sheet is passed along a second path to the applicating station. At the station processing fluid is dispersed and spread between the sheets as the latter are pressed or superposed together in a manner so that imbibition commences. These superposed sheets are advanced along an imbibition path so that images are transferred to the positive sheet. Following imbibition, the image bearing positive sheet can be dried, laminated and cut for forming individual identification cards. This invention includes a system appropriate for carrying out the previously described method.

Among the objects of the invention are, therefore; the provision of an improved identification method and system which rely upon taking positive prints of a subject at a remote station with a simple camera of the instant developing type and transmitting the print and corresponding identifying indicia to a central identification processing station; the provision of a method and system wherein separate prints are exposed onto successive sections of a roll of elongated diffusion transfer film at a central identification station; the provision of a method and system of the foregoing type wherein the exposed roll of negative diffusion transfer strip is processed with a second positive strip to commence imbibition and transferring of the image from the negative to the positive; and, the provision of a method of the foregoing type wherein each of the individual exposures on the diffusion transfer sheet are exposed with coded information for security purposes.

Other objects and further scope of applicability of the present invention will become apparent from the detailed description to follow when taken in conjunction with the accompanying drawings in which like parts are designated by like reference numerals.

DETAILED DESCRIPTION

Figure 4:
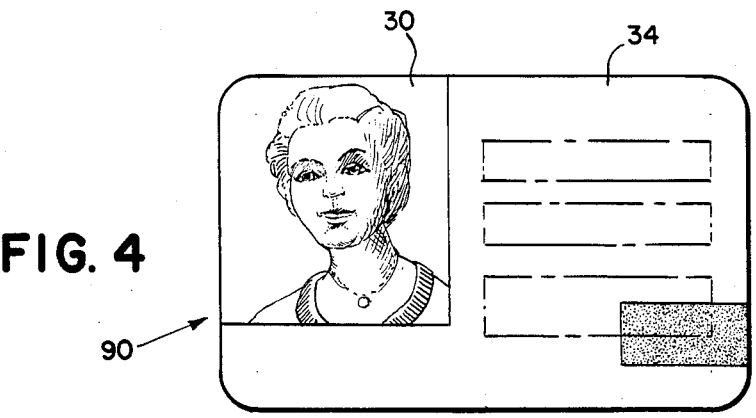
Figure 1:
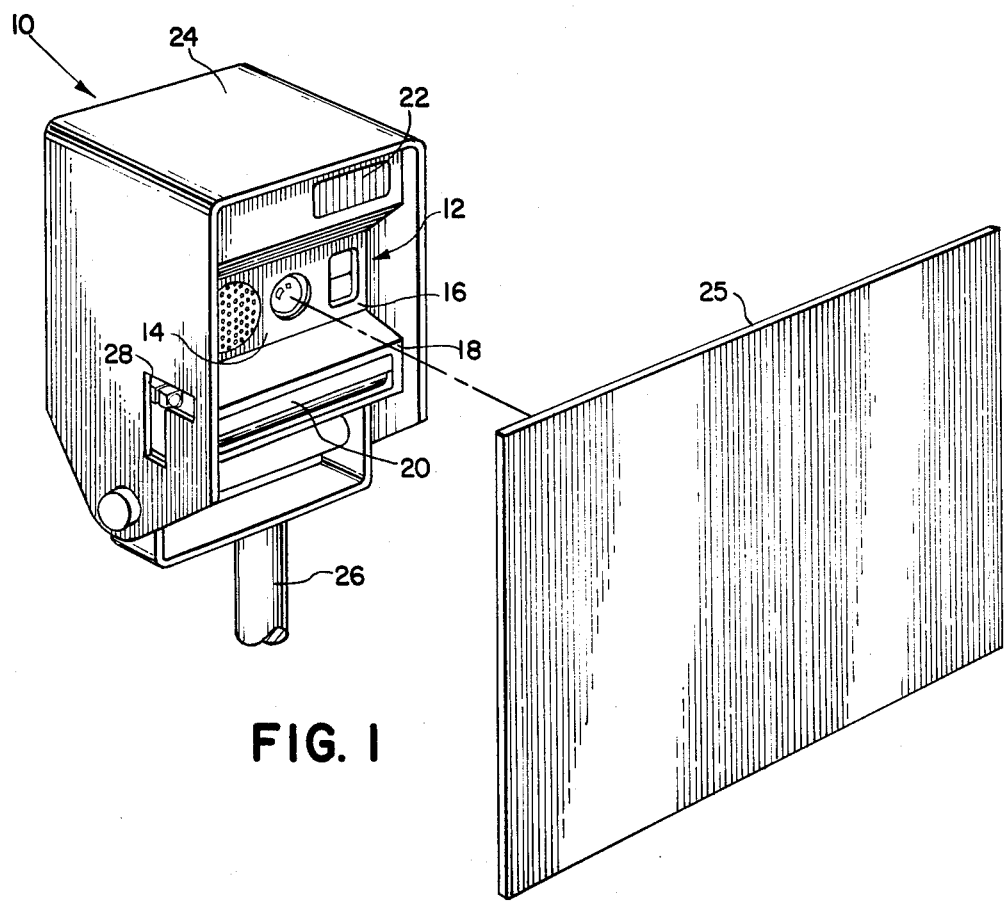
FIG. 1 is a perspective view of a photographic device of the instant type which would be used at a field station for photographing subjects to be identified.
Figure 2:
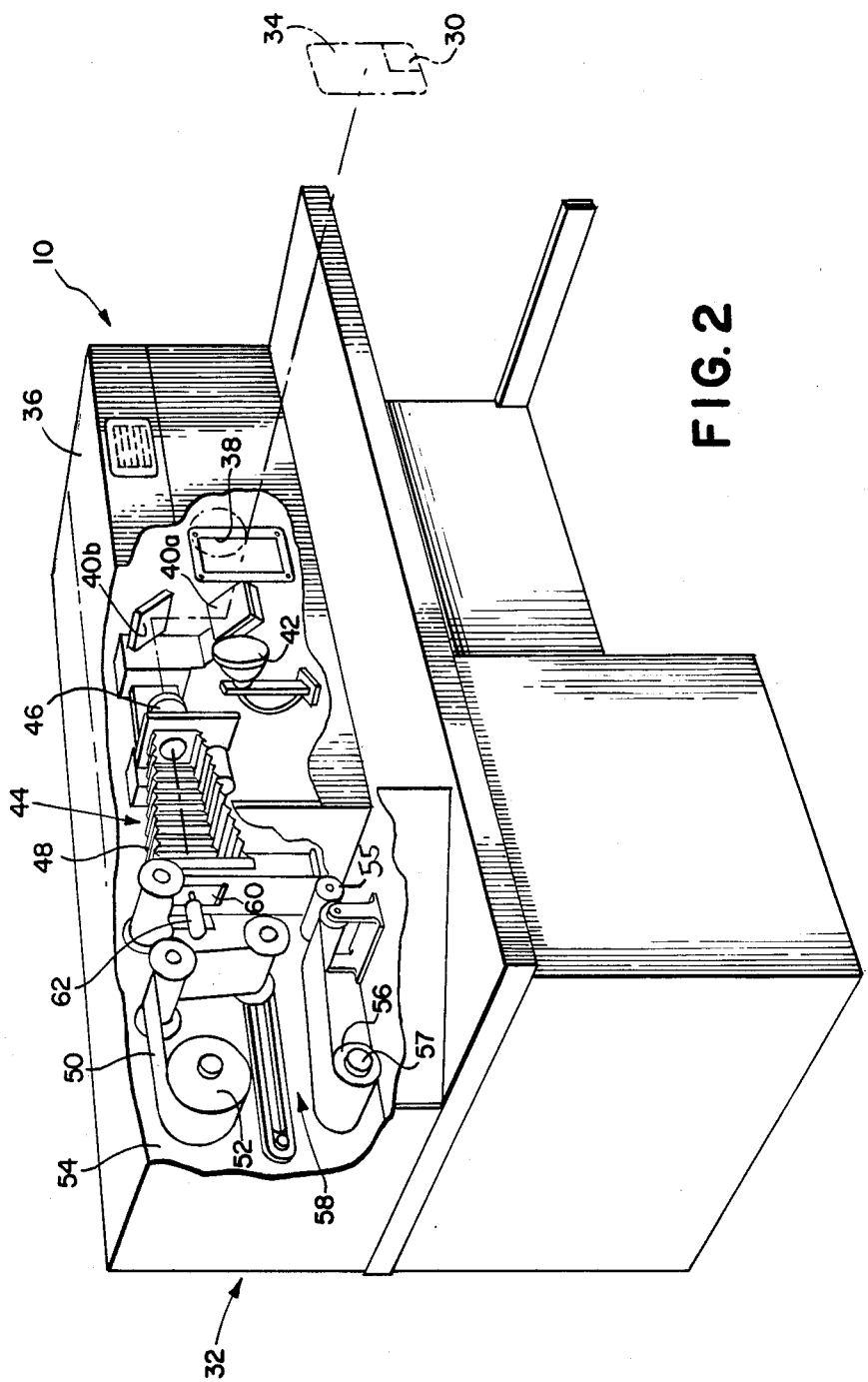
FIG. 2 is a perspective view of a photographic apparatus to be used at a central processing station with portions broken away for illustrating greater detail of such photographic apparatus.

Reference is made to the FIGS. 1-4 of the drawings for depicting an identification system 10 and method mode according to the present invention. The identification system 10 envisions use of a well-known instant or self-developing type camera 12 such as disclosed in commonly assigned U.S. Pat. No. 4,231,645.

Briefly, such a camera includes a housing 14, having at the lower end thereof, a base section 16 and pivotally attached thereto a film loading and unloading door 18. When the door 18 is opened (not shown) a film pack (not shown) may be loaded into the base section 16. A film unit withdrawal slot 20 for permitting exiting of the film unit is provided. Mounted on the housing 14 is a flash unit 22 for providing artificial illumination. Of course, the flash unit 22 is positioned so that its light output is directed into the camera's optical field of view towards a back-drop 25. The camera housing 14 is provided with an exposure chamber (not shown) which receives a self-developing film pack system (not shown) of the type holding a plurality of self-developing film units along with a battery for powering the camera's electrical system. In this embodiment, it is desired to use a pack of small format self-processing film units which can be used in cameras designed for larger format or standard film units. A representative example of such a film pack for use in cameras of the above type is described generally in commonly assigned U.S. Pat. No. 4,229,090 issued on Oct. 21, 1980 to J. J. Driscoll et al.

In the illustrated embodiment, the camera 12 is housed in a protective housing 24 mounted on a support stand 26. The protective housing 24 has the configuration shown in the drawings and is provided with L-shaped notch 28 which permits depressing a camera actuation switch and a loading door latch.

It is contemplated that the camera 12 be used at different field locations for photographing individuals which are to be identified. It will be appreciated that the resultant photographic print (not shown in FIG. 1) will reveal instantly whether a proper photograph of the individual has been taken. Moreover, such a camera 12 is relatively inexpensive. Hence, they can be used at a plurality of different locations for identification purposes as part of an inexpensive identification system.

After the photographic print (not shown) has been produced it together with appropriate identifying alphanumeric information corresponding to the subject being photographed is forwarded to a central processing station. At the central processing station, a plurality of positive prints (not shown) are received from the different locations at which identifying prints were taken. These positive prints together with appropriate identifying indicia are exposed separately onto successive sections of an elongated strip of negative diffusion transfer film which will be later developed.

For exposing a positive print 30 on a strip of negative diffusion transfer film there is provided a copy camera apparatus 32. Along with exposure of a photographic print 30 a corresponding alphanumeric information card 34 is exposed therewith. Included in the copy apparatus 32 is console 36 having formed therein an aperture 38. At the aperature 38, the combination of positive photographic print 30 and corresponding information card 34 bearing appropriate alphanumeric information identifying the subject of the positive print are positioned so that they can be photographed.

In this particular embodiment, provision is made for an optical system comprising mirrors 40a,b, an illuminating lamp 42, a camera 44 having a lens 46 on a bellows 48 and a shutter mechanism (not shown). But for the aperture 38 the area housing the mirrors is light-tight. A negative strip 50 of diffusion transfer film is stored on a supply roll 52 within a light-tight compartment 54. The strip of film 50 travels along a path defined by support rollers and a standard type dancer mechanism generally indicated by reference numeral 58. As noted, the strip 50 passes under suitable tension along a vertical path which is coincidental with the focal plane of the camera 44. From the focal plane, the film strip 50 travels along a path to the indexing drive roll 55 and then to the removable take-up roll 56 on a driven shaft 57. During exposure, a suitable planar film gate 60 is actuated to clamp the strip 50 to insure that the film is supported on and by a planar surface. The gate 60 is operated between clamping and non-clamping positions by a suitable solenoid type plunger 62. When the solenoid 62 is energized, at the beginning of an exposure cycle, the gate 60 is moved to its clamping position (not shown); simultaneously, the indexing roll 55 is not driven. The shutter mechanism of the camera 44 is actuated for an exposure cycle. The exposure cycle can commence after an operator places information card 34 and print 30 at the exposure aperture 38. The illuminating light 42 is energized and it lights the card sufficiently so that a proper exposure can be taken, the illuminating lamp 42 ceases to operate and the solenoid 62 is deenergized to allow the film gate 60 to release the film strip 50 so that the latter can be driven by the indexing roll 55. The foregoing described copying camera 44 does not, per se, form an aspect of the present invention. Hence, a detailed description of the camera need not be set forth. It will be appreciated that whatever camera is used it should be able to index the roll of film 50 so that successive sections can be exposed.

Successive sections of the film strip 50 are to be exposed with the composite images of both the photograph and the associated indicia card. For producing duplicate images on the strip 50, the operator merely has to take a second exposure of the card 34 carrying the print. For providing verification, a coded, generally transparent, verification plate (not shown) is inserted over the focal plane so that a verification code can be exposed on the diffusion transfer film strip 50. After completely exposing the film 50, the take-up roll 56 is removed from the light-tight compartment 54 for subsequent processing in accordance with the present invention. It will be appreciated that there is provided a leader at both ends of the strip.

Figure 3:
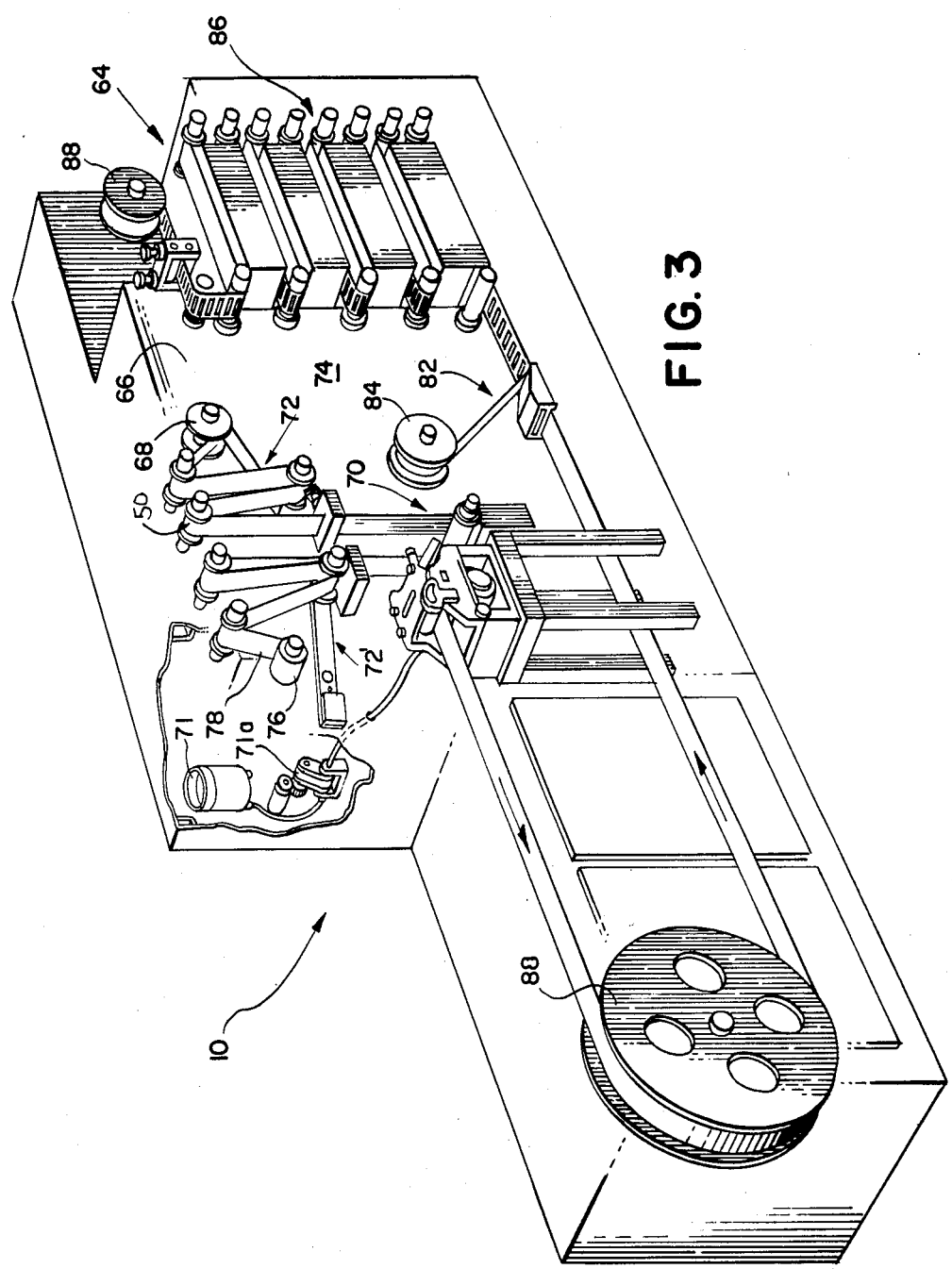
FIG. 3 is a perspective view of a processing apparatus to be used at the central processing station with portions broken away for illustrating greater details of such processing apparatus; and, FIG. 4 is a view of an identification card of the type which can be produced by the present invention.

FIG. 3 shows a film processing apparatus 64 used in the present invention. There is provided a light-tight compartment 66 for housing the roll 68 of film of recently exposed negative film strip. The roll 68 is rotatably supported on a suitable shaft for permitting dispensing of the negative film strip 50 therefrom. The film strip 50 travels along a path to a fluid applicator station 70. A supporting roller and dancing arm mechanism 72 apply adequate tension to the advancing exposed negative strip 50. In another light-tight compartment 74, there is provided a roll 76 of positive-image receiving sheet or strip material 78. The positive sheet material 78 is also passed over a path in part defined by a supporting roller and dancing arm mechanism 72' to the fluid applicator station 70, whereat both the exposed negative and positive sheet materials 50, 78 are superposed together. Just prior to superimposition, fluid is applied to one surface of the negative through a fluid applicator (not shown). The fluid applicator can be of a type disclosed in copending U.S. application Ser. No. 529,105 filed Sept. 2, 1983. A source 71 of processing fluid is pumped by pumping mechanism 71a to the fluid applicator. Actual superpositioning of the strips 50, 78 and spreading of the processing fluid into a uniform thin layer therebetween is accomplished by passing the strips between a pair of pressure-applying rollers (not shown) but described in said last noted copending application. Upon spreading of the fluid an imbibition period commences whereby the latent images carried by negative strip 50 are transferred to the positive strip 78. Imbibition takes place for a prescribed period of time. In this embodiment the imbibition period usually lasts for approximately one minute.

Although a positive image receiving strip is disclosed it will be appreciated that the strip 78 can be comprised of a transparent material having incorporated therein capsules of processing fluid which are burst when subjected to the pressure of the pressure rollers. In this manner, the processing fluid is dispersed and spread between the two superposed sheets.

The fluid processing apparatus 64 handles hundreds of feet of positive and negative sheets in a relatively short period of time. For purposes of reducing the size of the apparatus, the present invention runs the superposed positive and negative strips 50, 78 around a relatively large diametered imbibing wheel 80. This wheel 80, because of its relatively large diameter, has been found to permit the superposed positive and negative strips 50, 78 to change direction without relative slippage therebetween. Therefore, a more compact processing apparatus 64 is provided for processing the superposed strips since there is no requirement for an extended linear imbibing path.

At a stripping station 82, the negative strip 50 is stripped from the positive strip 78 after the requisite imbibition perod. For effecting this stripping action, a negative take-up spool 84 is driven so as to cause separating of the negative from the positive.

Thereafter, the positive strip 78 carrying the images is advanced through a hot air drying apparatus 86 and to a positive take-up reel 88 exteriorly mounted on the apparatus 64. In the drying apparatus 86, there are a plurality of heating units which direct heated air onto the entire surface of the positive sheet 78. The temperature and moisture content of the heated air are suitably selected to achieve the drying effect. In this regard, the positive strip 78 follows a serpentine path through a plurality of heating units of the apparatus 86. Although the foregoing drying process is disclosed others are contemplated so long as they effect the necessary drying. Processing terminates when coded information carried on either or both of the positive and negative is sensed by a detector (not shown), for example, a magnetic detector which detects a magnetic strip on either or both of the positive and negative strips. Accordingly, the take-up spools are not driven and the fluid applicator ceases dispensing of the processing fluid.

Subsequent to the separation and collection of the positive strip 78, the latter is subjected to a plurality of conventional steps (not shown) for laminating each of the composite images of the positive print 30 and information card 34. To form individual identification documents 90 the laminated positive strip 78 is suitably cut around each of the composite images on the sheet by known cutting means not forming part of this invention. Since the laminating and cutting steps are conventional and do not form part of the present invention there is no need to describe them in detail.

It is believed the operation of the entire identification system and method is obvious from the preceding description. It is apparent that there is no need for complicated processing stations at each field location where individuals are to be identified. Rather a single central processing apparatus is useful for preparing individual identification cards in high volume with very little skill required by an operator. The present invention is highly reliable insofar as the number of parameters to control is relatively small. Moreover, verification of each card can be more reliably controlled at a central location.

Since certain changes may be made in the above-described system and method without departing from the scope of the invention herein involved, it is intended that all matter contained in the description or shown in the accompanying drawings shall be interpreted as illustrative and not in a limiting sense.

What is claimed is:

1. An economical method of preparing hard copy identification documents each containing a composite of a photograph of a subject being identified and related alphanumeric information comprising the steps of:
  exposing each subject that is to be identified separately on an individual film unit at a plurality of field stations to obtain a positive print thereof, whereby the quality of the subject's image can be ascertained before forwarding to a central processing station;

transmitting said positive prints of the subjects to a central processing station along with appropriate alphanumeric information relating to each of the subjects;

exposing individual ones of said positive prints simultaneously with their respective said alphanumeric information at the central processing station on successive sections of an elongated strip of diffusion transfer film;

automatically advancing the exposed strip along a first path to a processing station at the central station and advancing a second sheet along a second path to the processing station;

superimposing the advancing strips by pressure-applying members to disperse fluid between the advancing strips to initiate imbibition of the exposed strip;

advancing the superposed strips along an imbibition path so that visible images are formed on one of the strips; and, drying the strip containing the images thereby facilitating laminating and cutting of the strip to form an individual identification document for each of said subjects.

2. A method of preparing hard copy identification documents each containing a composite of a photograph of a subject being identified and related alphanumeric information comprising the steps of:

exposing a subject that is to be identified on individual film units of the self-developing type for obtaining a positive print, whereby the quality of the subjects' image can be ascertained before forwarding to a central processing station;

transmitting the positive print to a central processing location along with appropriate alphanumeric information relating to the subject;

exposing individual ones of the positive prints at the central processing station on successive sections of an elongated strip of diffusion transfer film simultaneously with the alphanumeric information identifying each subject on the positive print;

automatically advancing the exposed strip along a first path to a processing station at the central station, and advancing a positive image receiving strip along a second path to the processing station;

treating at least one surface of one of the advancing strips with processing fluid at the processing station;

superimposing the advancing strips by pressure-applying members such that the treated surface is juxtaposed the other strip whereby the processing fluid between the advancing strips is spread to initiate imbibition of the exposed strip, advancing the superposed strips along an imbibition path so that visible images are formed on the positive strip;

separating the positive and negative strips; and, drying the positive strip whereby the positive prints can be laminated and cut to form identification documents.

3. The method of claim 2 wherein said step of exposing individual prints includes exposing coded information onto the film for security purposes.

4. A system for preparing hard copy identification documents each containing a composite of a photograph of a subject being identified and related alphanumeric information comprising:

photographic apparatus at a plurality of separate field locations which expose each subject that is to be identified on separate film units to provide a positive print, whereby the quality of the subject's image can be ascertained before forwarding to a central processing station;

means at the central processing station for exposing the separate positive prints on successive sections of an elongated strip of diffusion transfer film simultaneously with alphanumeric information identifying each respective subject on the positive print;

means for processing the exposed elongated film strip;

said processing means includes means for advancing the exposed strip along a first path, and for advancing a second strip along a second path which is convergent to the first path, means for superposing the exposed strip and second strip such that processing fluid is dispersed and spread therebetween for initiating imbibition, means defining an imbibition path along which said superposed strips travel so that visible images are formed on one of the strips, and means for drying the strip containing the developed images.

5. A system for preparing hard copy identification documents each containing a composite of a photograph of a subject being identified and related alphanumeric information comprising:

photographic apparatus at separate field locations which expose each subject that is to be identified on individual film units of the self-developing type so as to provide a positive print, whereby the quality of the subject's image can be ascertained before forwarding to a central processing station;

means at the central processing station for exposing the separate positive prints on successive sections of an elongated strip of diffusion transfer film simultaneously with the alphanumeric information identifying each respective subject on the positive print;

means for processing the exposed elongated film strip;

said processing means includes means for advancing the exposed strip along a first path, and for advancing a second strip along a second path which is convergent to the first path, means for treating at least one surface of one of said strip with processing fluid, means for superposing the exposed strip and second strip such that the treated surface is in contact with the other strip and the fluid is spread between the strips for initiating imbibition, means defining an imbibition path along which said superposed strips travel so that visible images are formed on one of the strips, means for separating the strips; and means for drying the strip containing the developed images after separation.

* * * * *